(12) United States Patent
Yoshida

(10) Patent No.: US 9,489,408 B2
(45) Date of Patent: Nov. 8, 2016

(54) DATA PROCESSING DEVICE AND METHOD FOR CONTROLLING THE SAME

(71) Applicant: FUJITSU LIMITED, Kawasaki-shi, Kanagawa (JP)

(72) Inventor: Yuki Yoshida, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/631,372

(22) Filed: Feb. 25, 2015

(65) Prior Publication Data

US 2015/0278262 A1    Oct. 1, 2015

(30) Foreign Application Priority Data

Mar. 26, 2014 (JP) ................. 2014-064104

(51) Int. Cl.
*G06F 17/00* (2006.01)
*G06F 17/30* (2006.01)

(52) U.S. Cl.
CPC ................. *G06F 17/30312* (2013.01)

(58) Field of Classification Search
USPC .................................. 235/375, 487
See application file for complete search history.

(56) References Cited

U.S. PATENT DOCUMENTS

| | | | | |
|---|---|---|---|---|
| 5,479,467 A | * | 12/1995 | Katsumata | B41J 29/393 377/15 |
| 5,918,222 A | * | 6/1999 | Fukui | G06Q 10/10 |
| 2006/0006987 A1 | * | 1/2006 | Hashimoto et al. | 340/10.51 |
| 2007/0067622 A1 | * | 3/2007 | Nakano et al. | 713/163 |
| 2007/0174448 A1 | * | 7/2007 | Ahuja | G06Q 10/10 709/224 |
| 2008/0140547 A1 | * | 6/2008 | Murphy | G06Q 40/06 705/30 |
| 2008/0224823 A1 | * | 9/2008 | Lawson | G06F 21/34 340/5.8 |
| 2010/0223531 A1 | * | 9/2010 | Fukutomi et al. | 714/764 |
| 2012/0050812 A1 | * | 3/2012 | Takahashi | 358/1.16 |
| 2013/0238986 A1 | * | 9/2013 | Hattori | G06F 17/2288 715/256 |
| 2014/0301718 A1 | * | 10/2014 | Takahashi | G11B 19/02 386/291 |
| 2015/0347028 A1 | * | 12/2015 | Kotte | G06F 3/0611 711/154 |
| 2015/0347030 A1 | * | 12/2015 | Mathur | G06F 3/0611 711/118 |

FOREIGN PATENT DOCUMENTS

| | | |
|---|---|---|
| JP | 2005-275942 | 10/2005 |
| JP | 2006-172401 | 6/2006 |
| JP | 2009-223487 | 10/2009 |

* cited by examiner

*Primary Examiner* — Edwyn Labaze
(74) *Attorney, Agent, or Firm* — Staas & Halsey LLP

(57) ABSTRACT

A data processing device including a processing unit that performs data processing and a history recording module that records an operation history of the processing unit. The history recording module includes a storage unit that stores therein history information, and a recording control unit that writes content recording information recording contents and count information recording a counted value in the storage unit as the history information, recording information being broken into the content recording information and the count information.

6 Claims, 10 Drawing Sheets

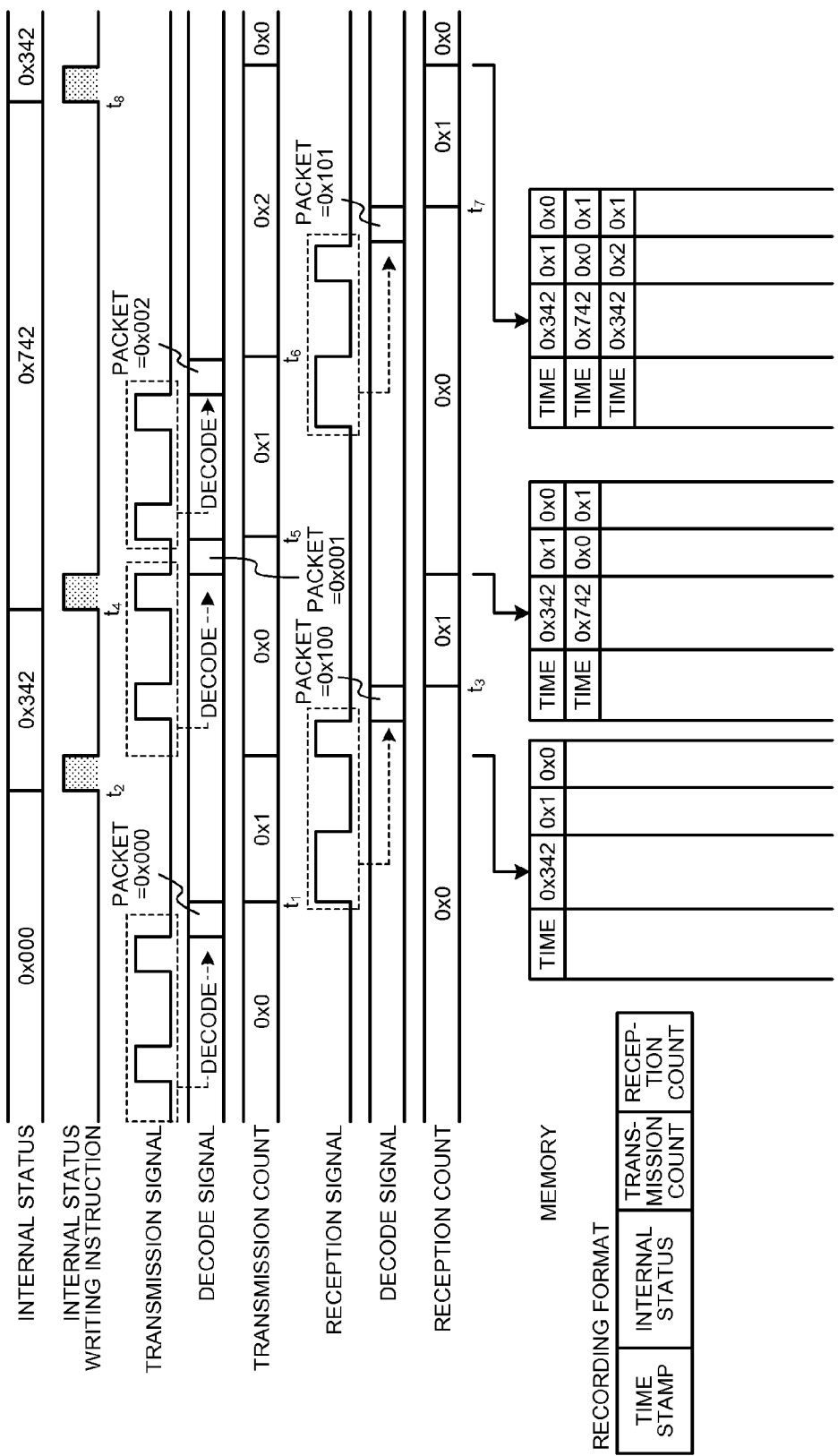

FIG.3

WORD (4 BYTES)

| ADDRESS | 12 BITS | 8 BITS | 12 BITS |
|---|---|---|---|
| 0x00 | TIME | 0x10 | 0x000 |
| 0x01 | TIME | 0x00 | 0x342 |
| 0x02 | TIME | 0x11 | 0x100 |
| 0x03 | TIME | 0x00 | 0x742 |
| 0x04 | TIME | 0x10 | 0x001 |
| 0x05 | TIME | 0x10 | 0x002 |
| 0x06 | TIME | 0x11 | 0x101 |
| 0x07 | TIME | 0x00 | 0x342 |
| ... | ... | ... | ... |

TIME (12 BITS)

TYPE (8 BITS): INDICATING RECORD OF TRANSMISSION COUNT, RECEPTION COUNT, OR INTERNAL STATUS

DATA (12 BITS): INDICATING
· TRANSMISSION COUNT VALUE WHEN TYPE INDICATES TRANSMISSION COUNT
· RECEPTION COUNT VALUE WHEN TYPE INDICATES RECEPTION COUNT
· INTERNAL STATUS VALUE WHEN TYPE INDICATES INTERNAL STATUS

DATA PROCESSING DEVICE AND METHOD FOR CONTROLLING THE SAME

CROSS-REFERENCE TO RELATED APPLICATION

This application is based upon and claims the benefit of priority of the prior Japanese Patent Application No. 2014-064104, filed on Mar. 26, 2014, the entire contents of which are incorporated herein by reference.

FIELD

The embodiments discussed herein are related to a data processing device and a method for controlling the data processing device.

BACKGROUND

There exists the case that a data processing device is brought into an abnormal operation due to bugs or failures in a circuit, bugs in a program, data irregularly input from an external device, or the like. In order to determine the cause of the abnormal operation, it is preferably to record and analyze histories such as an internal state of the data processing device, a signal between internal circuits, or an input/output signal from/to an external device. Also in adjustment for performance improvements or the like, it is effective to record and analyze the histories in order to grasp the availability ratio or the like of the internal circuit or the input/output signal.

Usually, historical data is recorded on a memory for recording the history with a recording time. The historical data is then read out from the memory and analyzed, when the abnormal operation occurs.

Here, as a technique relevant to historical-data collection, there has been a conventional technique that collects each of two kinds of log information; that is, detailed log information for investigating the cause of a failure when the failure occurs, and normal log information for grasping a normal state. Furthermore, there has been a conventional technique that respectively records identifiers corresponding to various parameters in the operation process log indicating the event performed in an application group or the internal state so as to generate an identifier recording/operation process log, and records the identifier recording/operation process log on a log recording memory. In addition, there has been a conventional technique that records the event occurrence frequency of the same event pattern developed in the event information when an analysis object program is executed.

Patent Document 1: Japanese Laid-open Patent Publication No. 2006-172401
Patent Document 2: Japanese Laid-open Patent Publication No. 2005-275942
Patent Document 3: Japanese Laid-open Patent Publication No. 2009-223487

The memory for recording the histories has a finite capacity and hence, there is no other choice but the data processing device has to stop history recording or overwrite sequentially from the head of the memory when the memory becomes full. Therefore, there has been a problem in that information helpful for specifying the cause of the occurrence of the abnormal operation is sometimes unrecorded or deleted by overwriting.

SUMMARY

According to an aspect of an embodiment, a data processing device includes a processing unit that performs data processing and a history recording module that records an operation history of the processing unit, the history recording module including a storage unit that stores therein history information, and a recording control unit that writes content recording information recording contents and count information recording a counted value in the storage unit as the history information, recording information being broken into the content recording information and the count information.

According to another aspect of an embodiment, a method for controlling a data processing device that includes a processing unit that performs data processing and a history recording module that records an operation history of the processing unit in a storage unit, the method including writing, by the history recording module, with respect to content recording information recording contents out of recording information, a history of the contents in the storage unit, and writing, by the history recording module, with respect to count information recording a counted value out of the recording information, the history of the counted value in the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a timing chart of history recording according to the first embodiment;
FIG. 3 is a view illustrating an example of a memory structure.

DESCRIPTION OF EMBODIMENTS

Preferred embodiments of the present invention will be explained with reference to accompanying drawings.

Here, a technique disclosed herein is not limited to each of the embodiments. Furthermore, the embodiments can be appropriately used in combination as long as the processes do not conflict with each other.

[a] First Embodiment

Figure 1:
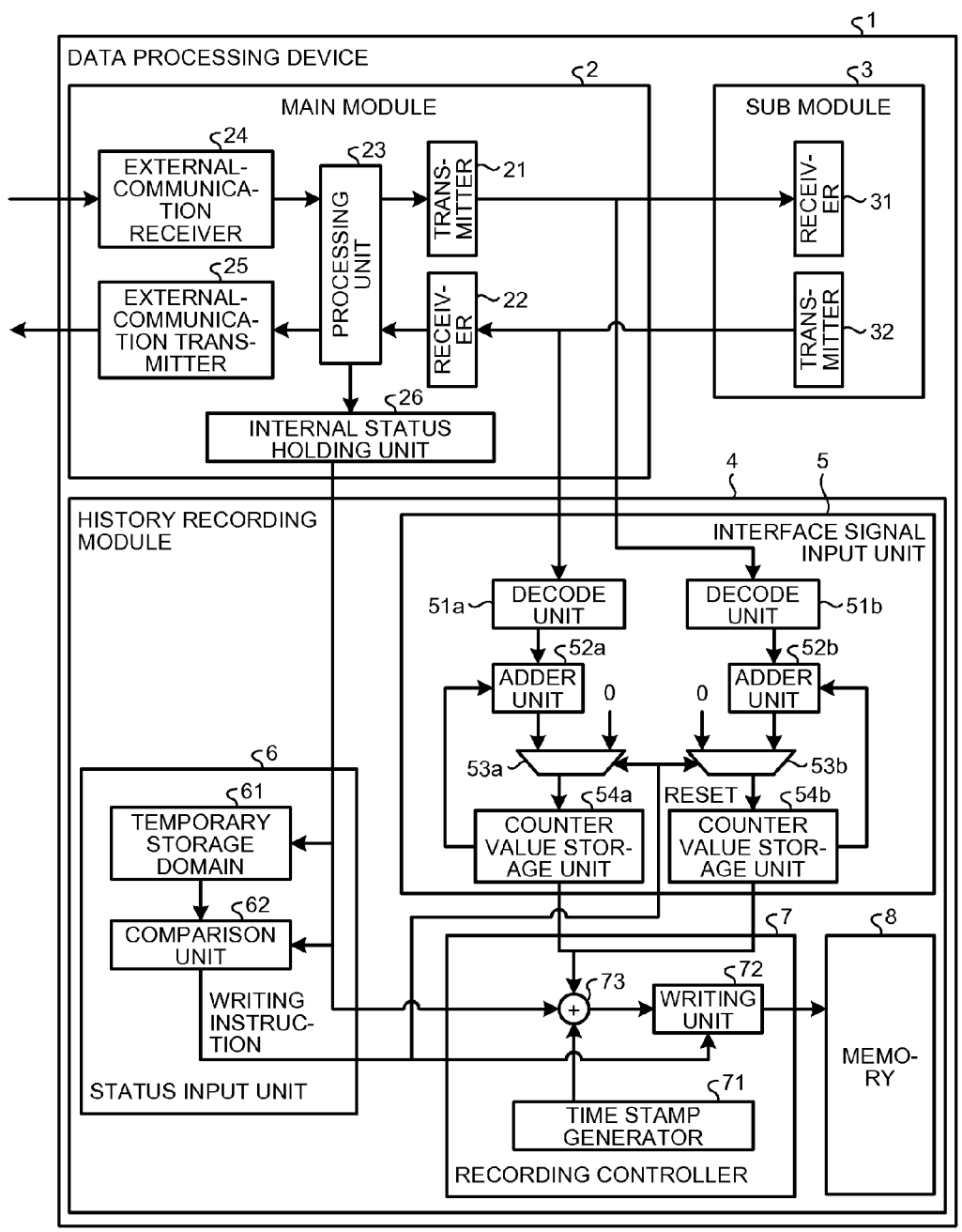
FIG. 1 is a view illustrating a configuration of a data processing device according to a first embodiment.

First of all, a configuration of a data processing device according to a first embodiment is explained. FIG. 1 is a view illustrating the configuration of the data processing device according to the first embodiment. As illustrated in FIG. 1, a data processing device 1 has a main module 2, a sub module 3, and a history recording module 4.

The main module 2 is a module that performs data processing, such as a central processing unit (CPU) module. The main module 2 has a transmitter 21, a receiver 22, a processing unit 23, an external-communication receiver 24, an external-communication transmitter 25, and an internal status holding unit 26.

The transmitter 21 transmits a packet to the sub module 3. The receiver 22 receives a packet transmitted from the sub module 3. The processing unit 23 performs data processing while communicating with the sub module 3 or another device. The external-communication receiver 24 receives a packet from the other device such as the other data processing device. The external-communication transmitter 25 transmits a packet to the other device such as the other data processing device. The internal status holding unit 26 holds an internal status value indicating the state of a predetermined part in the processing unit 23.

The sub module 3 is a module that transmits/receives a packet to/from the main module 2, such as a memory module that mounts a cache memory thereon. The sub module 3 has a receiver 31 and a transmitter 32. The receiver 31 receives a packet from the main module 2. The transmitter 32 transmits a packet to the main module 2.

The history recording module 4 records the history of data held by the internal status holding unit 26. The history recording module 4 counts transmission packets transmitted by the transmitter 21 and reception packets received by the receiver 22, and records the number of the transmission packets and the number of the reception packets. The history recording module 4 has an interface signal input unit 5, a status input unit 6, a recording controller 7, and a memory 8.

The interface signal input unit 5 inputs thereto the signals of the transmission packets transmitted by the transmitter 21, and counts the number of the transmission packets. The interface signal input unit 5 inputs thereto the signals of the reception packets received by the receiver 22, and counts the number of the reception packets. The interface signal input unit 5 has decode units 51a and 51b, adder units 52a and 52b, selection units 53a and 53b, and counter value storage units 54a and 54b.

The decode unit 51a decodes the signal received by the receiver 22, and detects the reception packet. The decode unit 51a instructs, when the reception packet is detected, the adder unit 52a to add one (1) to a counter value. The adder unit 52a reads out, based on the addition instruction from the decode unit 51a, the counter value from the counter value storage unit 54a to add one (1) to the counter value. The selection unit 53a writes the output of the adder unit 52a in the counter value storage unit 54a when not receiving a reset signal from the status input unit 6. The selection unit 53a resets the counter value to write zero (0) in the counter value storage unit 54a when receiving a reset signal from the status input unit 6. The counter value storage unit 54a stores therein the number of the reception packets received by the receiver 22 as the counter value.

In this manner, by using the decode unit 51a, the adder unit 52a, the selection unit 53a, and the counter value storage unit 54, the interface signal input unit 5 counts the number of the reception packets received by the receiver 22.

The decode unit 51b decodes the signal transmitted by the transmitter 21, and detects the transmission packet. The decode unit 51b instructs, when detecting the transmission packet, the adder unit 52b to add one (1) to a counter value. The adder unit 52b reads out, based on the addition instruction from the decode unit 51b, the counter value from the counter value storage unit 54b to add one (1) to the counter value. The selection unit 53b writes the output of the adder unit 52b in the counter value storage unit 54b when not receiving a reset signal from the status input unit 6. The selection unit 53b resets the counter value to write zero (0) in the counter value storage unit 54b when receiving the reset signal from the status input unit 6. The counter value storage unit 54b stores therein the number of the transmission packets transmitted by the transmitter 21 as the counter value.

In this manner, by using the decode unit 51b, the adder unit 52b, the selection unit 53b, and the counter value storage unit 54b, the interface signal input unit 5 counts the number of the transmission packets transmitted by the transmitter 21.

The status input unit 6 inputs therein the internal status value held by the internal status holding unit 26. When the internal status value is changed, the status input unit 6 instructs the recording controller 7 to write the changed internal status value in the memory 8. Furthermore, the status input unit 6 instructs, in instructing the recording controller 7 to write the internal status value in the memory 8, the interface signal input unit 5 to reset the counter value storage units 54a and 54b. Here, although the status input unit 6 instructs the interface signal input unit 5 to reset the counter value storage units 54a and 54b, it is unnecessary to instruct the interface signal input unit 5 to reset the counter value storage units 54a and 54b.

The status input unit 6 has a temporary storage domain 61 and a comparison unit 62. The temporary storage domain 61 holds temporarily the internal status value read out from the internal status holding unit 26. The comparison unit 62 compares the internal status value read out from the internal status holding unit 26 with the previous internal status value stored in the temporary storage domain 61. When the internal status value is changed, the comparison unit 62 instructs the recording controller 7 to write the changed internal status value in the memory 8.

The recording controller 7 writes the internal status value in the memory 8 based on the writing instruction from the status input unit 6. The recording controller 7 writes, in writing the internal status value input from the status input unit 6 in the memory 8, the counter values stored in the counter value storage units 54a and 54b, in the memory 8.

The recording controller 7 has a time stamp generator 71, a writing unit 72, and a connection unit 73. The time stamp generator 71 generates a time stamp to be appended to data to be written in the memory 8. The writing unit 72 appends the time stamp and the counter values stored in the counter value storage units 54a and 54b to the internal status value input from the status input unit 6, and writes the resultant value in the memory 8.

The connection unit 73 connects the internal status value input from the status input unit 6, the time stamp, and the counter values respectively stored in the counter value storage units 54a and 54b. Here, although the explanation is made with respect to the case that a time stamp is appended to data to be written in the memory 8, the time stamp may be omitted.

The memory 8 stores therein the internal status value of the processing unit 23, a transmission count, and a reception count as the historical data in association with the time stamp. Here, the transmission count is the number of packets transmitted by the transmitter 21, and the reception count is the number of packets received by the receiver 22.

Next, the timing of history recording according to the first embodiment is explained. FIG. 2 is a timing chart of history recording according to the first embodiment. As illustrated in FIG. 2, when 0x000 is decoded from a transmission packet at a timing $t_1$ such that an internal status value is 0x000, a transmission count is changed from 0x0 to 0x1. Here, "0x" indicates a hexadecimal number.

Furthermore, when the internal status value is changed from 0x000 to 0x342 at a timing $t_2$, the changed internal status value 0x342 is written in the memory 8 in association with the time stamp, the transmission count 0x1, and a reception count 0x0. Each of the transmission count and the reception count is reset to 0x0. Here, in FIG. 2, the time stamp, the internal status value, the transmission count, and the reception count are written in the memory 8 in the order given above. Furthermore, the value of the time stamp is referred to simply as "TIME".

When 0x100 is decoded from a reception packet at a timing $t_3$, the reception count is changed from 0x0 to 0x1. Furthermore, when the internal status value is changed from 0x342 to 0x742 at a timing $t_4$, the changed internal status value 0x742 is written in the memory 8 in association with the time stamp, the transmission count 0x0, and the reception count 0x1. Each of the transmission count and the reception count is reset to 0x0.

When 0x001 is decoded from a transmission packet at a timing $t_5$, the transmission count is changed from 0x0 to 0x1, and when 0x002 is decoded from a transmission packet at a timing $t_6$, the transmission count is changed from 0x1 to 0x2. Furthermore, when 0x101 is decoded from a reception packet at a timing $t_7$, the reception count is changed from 0x0 to 0x1.

When the internal status value is changed from 0x742 to 0x342 at a timing $t_8$, the changed internal status value 0x342 is written in the memory 8 in association with the time stamp, the transmission count 0x2, and the reception count 0x1. Each of the transmission count and the reception count is reset to 0x0.

As mentioned above, in the first embodiment, the interface signal input unit 5 counts the number of packets transmitted/received in communication between the main module 2 and the sub module 3. Furthermore, the writing unit 72 writes, when writing the internal status value in the memory 8 at a timing at which the internal status value of the processing unit 23 is changed, the number of transmission packets and the number of reception packets in the memory 8. That is, the writing unit 72 classifies recording information into content recording information such as an internal status value and count information such as the number of the transmission packets or the number of reception packets, and records the content recording information and the count information. Therefore, the data processing device 1 is capable of reducing the capacity of the memory 8 as compared with the case that histories are all recorded on the memory 8 as content recording information.

In the first embodiment, the explanation is made with respect to the case in which the writing unit 72 collectively writes the time stamp, the internal status value, the transmission count, and the reception count as one unit in the memory 8. However, the writing unit 72 is also capable of writing separately the internal status value, the transmission count, and the reception count in the memory 8.

FIG. 3 is a view illustrating an example of a memory structure in the case in which the writing unit 72 separately writes the internal status value, the transmission count, and the reception count in the memory 8. As illustrated in FIG. 3, the memory 8 stores therein one piece of information as one (1) word (32 bits).

The one piece of information includes a time stamp of 12 bits, a type of 8 bits, and data of 12 bits. In FIG. 3, "time" indicates the time stamp. In the "type," 0x10 indicates a transmission count, 0x00 indicates an internal status, and 0x11 indicates a reception count. The "data" is a transmission count value when the "type" is a transmission count, a reception count value when the "type" is a reception count, and an internal status value when the "type" is an internal status.

[b] Second Embodiment

In the first embodiment, the explanation is made with respect to the case in which recording is performed at a timing at which the internal status value is changed. However, a counter value may be recorded at a timing different from the timing at which the internal status value is changed. Accordingly, in a second embodiment, the explanation is made with respect to the case in which a counter value is recorded at a predetermined timing different from the timing at which the internal status value is changed.

Figure 4:
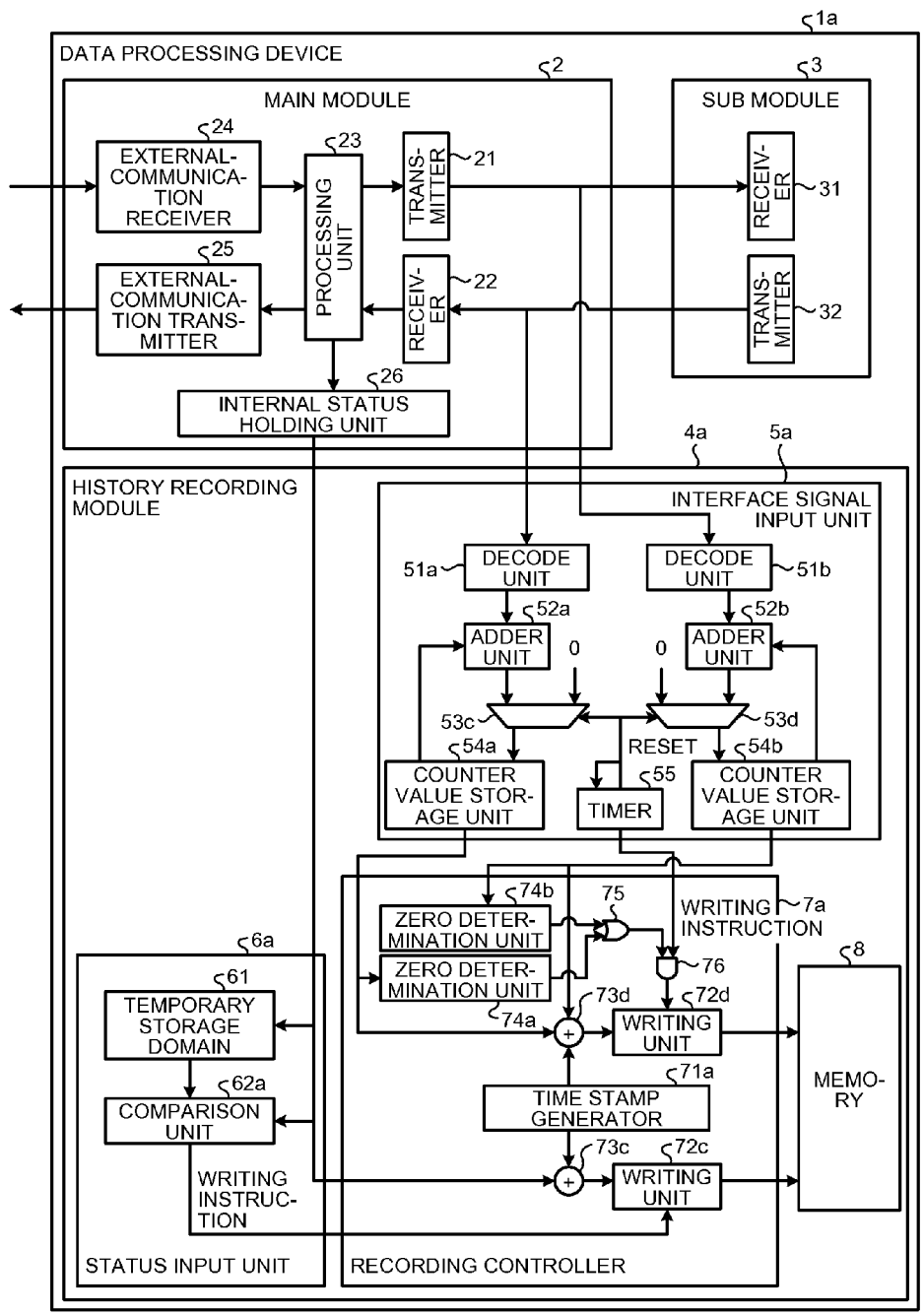
FIG. 4 is a view illustrating a configuration of a data processing device according to a second embodiment.

FIG. 4 is a view illustrating a configuration of a data processing device according to the second embodiment. Here, in the explanation made hereinafter, for the sake of convenience, function units having functions identical with those of the respective units illustrated in FIG. 1 are given same numerals, and their detailed explanations are omitted.

As indicated in FIG. 4, a data processing device 1a has a history recording module 4a in place of the history recording module 4 illustrated in FIG. 1. The history recording module 4a has an interface signal input unit 5a, a status input unit 6a, and a recording controller 7a in place of the interface signal input unit 5, the status input unit 6, and the recording controller 7 that are illustrated in FIG. 1, respectively.

The interface signal input unit 5a has selection units 53c and 53d in place of the selection units 53a and 53b illustrated in FIG. 1, and also has a timer 55. The selection units 53c and 53d do not receive a reset instruction from the comparison unit 62 illustrated in FIG. 1 but receive the reset instruction from the timer 55. The timer 55 instructs, when a predetermined time elapses, the recording controller 7a to write a counter value in the memory 8 and, at the same time, provides an instruction to reset the selection units 53c and 53d, and also resets the timer 55 per se.

The status input unit 6a has a comparison unit 62a in place of the comparison unit 62 illustrated in FIG. 1. The comparison unit 62a does not output a reset instruction to the selection units 53a and 53b as compared with comparison unit 62.

The recording controller 7a has a time stamp generator 71a, writing units 72c and 72d, and connection units 73c and 73d in place of the time stamp generator 71, the writing unit 72, and the connection unit 73 that are illustrated in FIG. 1, respectively. Furthermore, the recording controller 7a has zero determination units 74a and 74b, an OR circuit 75 that performs an OR operation, and an AND circuit 76 that performs an AND operation.

The time stamp generator 71a transfers a time stamp generated thereby to the connection units 73c and 73d. The writing unit 72c appends, when an internal status value is changed, a time stamp to the internal status value, and writes the resultant value in the memory 8. The writing unit 72c appends, when writing the internal status value, one (1) bit information indicating that data is an internal status value to the internal status value, and writes the resultant value in the memory 8. When the writing unit 72d receives a writing instruction from the timer 55 and either one of counter values stored in the respective counter value storage units 54a and 54b is not zero (0), the writing unit 72d appends a time stamp to the counter values, and writes the two counter values in the memory 8.

The connection unit 73c connects the internal status value and the time stamp, and the connection unit 73d connects the two counter values and the time stamp. The zero determination units 74a and 74b determine whether each of the counter values stored in the respective counter value storage units 54a and 54b is zero (0). When each of the counter values is not zero (0), each of the zero determination units 74a and 74b outputs a logical value "1" to the OR circuit 75. The OR circuit 75 outputs, when either one of the two counter values is not zero (0), the logical value "1" to the AND circuit 76. The AND circuit 76 instructs the writing unit 72d to write the counter value in the memory 8 when the AND circuit 76 receives a writing instruction from the timer 55 and the OR circuit 75 outputs the logical value "1".

Figure 5:
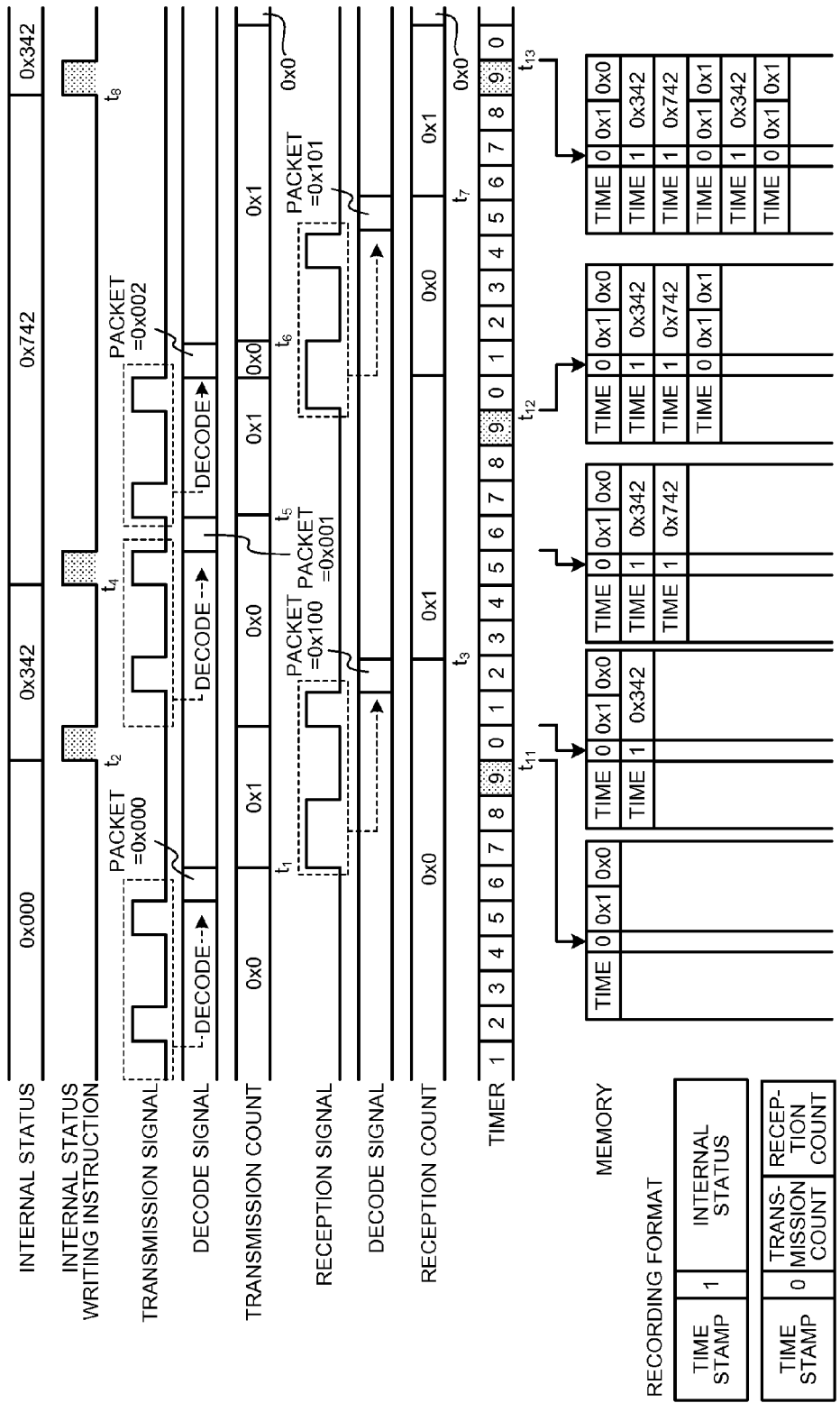
FIG. 5 is a timing chart of history recording according to the second embodiment.

Next, the timing of history recording according to the second embodiment is explained. FIG. 5 is a timing chart of history recording according to the second embodiment. As illustrated in FIG. 5, when 0x000 is decoded from a transmission packet at a timing $t_1$ such that an internal status value is 0x000, a transmission count is changed from 0x0 to 0x1. Furthermore, the transmission count and a reception count are written in the memory 8 at a timing $t_{11}$ such that the value of the timer 55 is set to ten (10). In this case, a time stamp and one (1) bit information "0" indicative of a counter value are written additionally in the memory 8. Furthermore, the timer 55 and the counter value storage units 54a and 54b are reset.

In FIG. 5, the time stamp, the one (1) bit information "0" indicative of a counter value, the transmission count, and the reception count are written in the memory 8 in the order given above. Here, although the transmission count and the reception count are written in the memory 8 at a timing at which the value of the timer 55 is set to 10, a timing at which the value of the timer 55 is set to the other value is applicable.

Furthermore, when the internal status value is changed from 0x000 to 0x342 at a timing $t_2$, the changed internal status value 0x342 is written in the memory 8. In this case, a time stamp and one (1) bit information "1" indicative of an internal status are appended to the internal status value. In FIG. 5, the time stamp, the one (1) bit information "1" indicative of an internal status, and the internal status value are written in the memory 8 in the order given above.

When 0x100 is decoded from a reception packet at a timing $t_3$, the reception count is changed from 0x0 to 0x1. Furthermore, when the internal status value is changed from 0x342 to 0x742 at a timing $t_4$, the changed internal status value 0x742 is written in the memory 8 in association with the time stamp, the one (1) bit information "1" indicative of an internal status.

When 0x001 is decoded from a transmission packet at a timing $t_5$, the transmission count is changed from 0x0 to 0x1. Furthermore, the transmission count and a reception count are written in the memory 8 at a timing $t_{12}$ such that the value of the timer 55 is set to ten (10). In this case, the timer 55 and the counter value storage units 54a and 54b are reset.

When 0x002 is decoded from a transmission packet at a timing $t_6$, the transmission count is changed from 0x0 to 0x1.

Furthermore, when 0x101 is decoded from a reception packet at a timing $t_7$, the reception count is changed from 0x0 to 0x1.

When the internal status value is changed from 0x742 to 0x342 at a timing $t_8$, the changed internal status value 0x342 is written in the memory 8 in association with the time stamp and the one (1) bit information "1" indicative of an internal status. Furthermore, the transmission count and the reception count are written in the memory 8 at a timing $t_{13}$ such that the value of the timer 55 is set to ten (10). In this case, the timer 55 and the counter value storage units 54a and 54b are reset.

As mentioned above, in the second embodiment, the writing unit 72c writes the internal status value in the memory 8 at a timing at which the internal status value is changed. On the other hand, when the writing unit 72d receives a writing instruction from the timer 55 and either one of counter values stored in the respective counter value storage units 54a and 54b is not zero (0), the writing unit 72d writes the two counter values in the memory 8. Therefore, the data processing device 1a is capable of reducing the capacity of the memory 8 as compared with the case that histories are all recorded on the memory 8 as content recording information.

Here, the explanation is made with respect to the case in which the writing unit 72d writes, when either one of the two counter values is not zero (0), the counter values in the memory 8. However, the writing unit 72d may write the counter values in the memory 8 without checking the counter values.

[c] Third Embodiment

Figure 6:
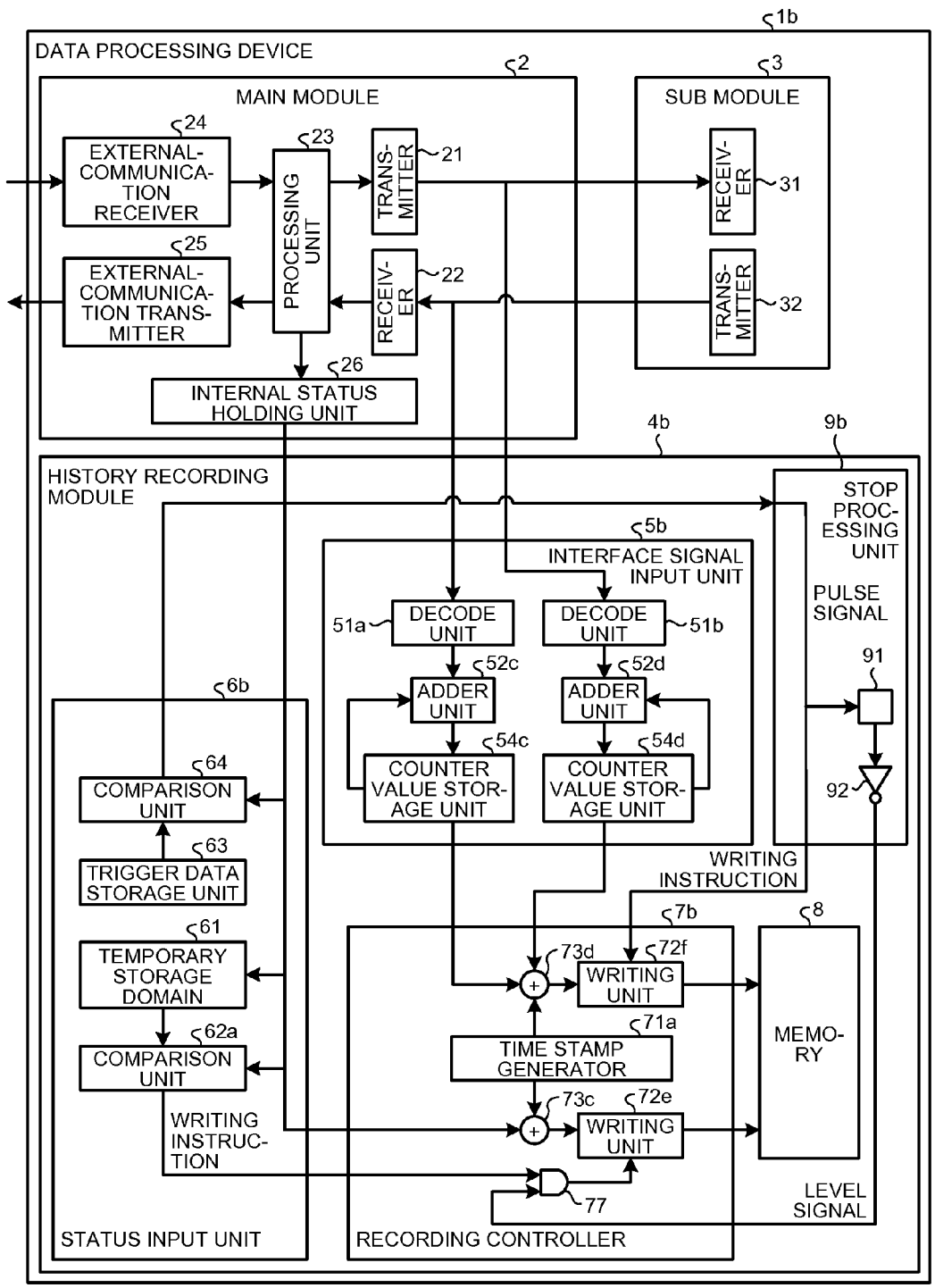
FIG. 6 is a view illustrating a configuration of a data processing device according to a third embodiment.

In a third embodiment, the explanation is made with respect to the case in which a counter value is recorded at the time when the recording of an internal status is stopped. FIG. 6 is a view illustrating a configuration of a data processing device according to the third embodiment. Here, in the explanation made hereinafter, for the sake of convenience, function units having functions identical with those of the respective units illustrated in FIG. 1 and FIG. 4 are given same numerals, and their detailed explanations are omitted.

As illustrated in FIG. 6, a data processing device 1b has a history recording module 4b in place of the history recording module 4 illustrated in FIG. 1. The history recording module 4b has an interface signal input unit 5b, a status input unit 6b, and a recording controller 7b in place of the interface signal input unit 5, the status input unit 6, and the recording controller 7 that are illustrated in FIG. 1, respectively. Furthermore, the history recording module 4b has a stop processing unit 9b.

The interface signal input unit 5b has adder units 52c and 52d and counter value storage units 54c and 54d in place of the adder units 52a and 52b and the counter value storage units 54a and 54b that are illustrated in FIG. 1, respectively. The interface signal input unit 5b is constituted without having the selection units 53a and 53b illustrated in FIG. 1.

The adder units 52c and 52d directly write addition results in the respective counter value storage units 54c and 54d. In the third embodiment, a counter value is written in the memory 8 only at the time when internal status recording is stopped and hence, it is unnecessary to repeatedly reset the counter value storage units 54c and 54d.

The status input unit 6b has a trigger data storage unit 63 and a comparison unit 64 in addition to the temporary storage domain 61 and the comparison unit 62a illustrated in FIG. 4. The trigger data storage unit 63 stores therein the internal status value whose recording is stopped as trigger data. The comparison unit 64 compares the internal status value input from the internal status holding unit 26 with the trigger data. When the internal status value coincides with the trigger data, the comparison unit 64 instructs the stop processing unit 9b to perform stop processing.

The recording controller 7b has a time stamp generator 71a, writing units 72e and 72f, and connection units 73c and 73d in place of the time stamp generator 71, the writing unit 72, and the connection unit 73 that are illustrated in FIG. 1, respectively. Furthermore, the recording controller 7b has an AND circuit 77.

The writing unit 72e appends a time stamp to the internal status value, and writes the internal status value in the memory 8 when the internal status value is changed, and until the stop processing unit 9b performs stop processing. Furthermore, the writing unit 72e appends, when writing an internal status value, one (1) bit information indicating that data is an internal status to the internal status value, and writes the resultant value in the memory 8. The writing unit 72f writes, when receiving a writing instruction from the stop processing unit 9b, two counter values in the memory 8 in association with a time stamp appended thereby. The AND circuit 77 ANDs a writing instruction from the status input unit 6b and a level signal from the stop processing unit 9b, and outputs the resultant signal to the writing unit 72e.

When the stop processing unit 9b is instructed from the comparison unit 64 to perform stop processing, the stop processing unit 9b instructs the writing unit 72f to record the two counter values and, at the same time, instructs the writing unit 72e to stop writing. The stop processing unit 9b has a latch 91 and a NOT circuit 92. The latch 91 inputs therein a stop processing execution instruction that is a pulse signal to hold a logical value "1." The NOT circuit 92 inverts the logical value held in the latch 91, and outputs the inverted logical value to the AND circuit 77 in the form of a level signal.

Figure 7:
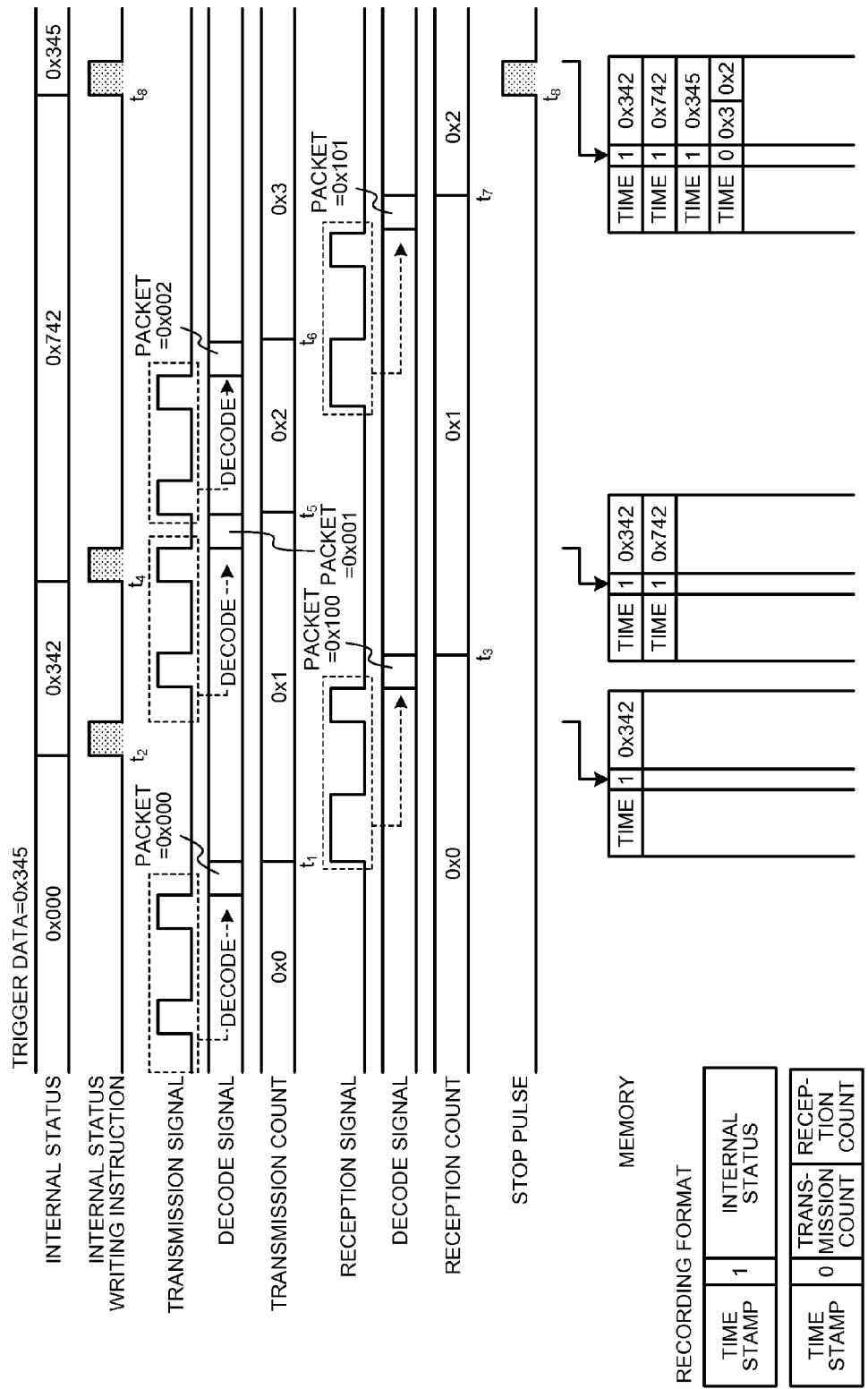
FIG. 7 is a timing chart of history recording according to the third embodiment.

Next, the timing of history recording according to the third embodiment is explained. FIG. 7 is a timing chart of history recording according to the third embodiment. As illustrated in FIG. 7, when 0x000 is decoded from a transmission packet at a timing $t_1$ such that an internal status value is 0x000, a transmission count is changed from 0x0 to 0x1.

Furthermore, when the internal status value is changed from 0x000 to 0x342 at a timing $t_2$, the changed internal status value 0x342 is written in the memory 8. In this case, a time stamp and one (1) bit information "1" indicative of an internal status are appended to the internal status value.

When 0x100 is decoded from a reception packet at a timing $t_3$, a reception count is changed from 0x0 to 0x1. Furthermore, when an internal status value is changed from 0x342 to 0x742 at a timing $t_4$, the changed internal status value 0x742 is written in the memory 8 in association with the time stamp, the one (1) bit information "1" indicative of an internal status.

When 0x001 is decoded from a transmission packet at a timing $t_5$, the transmission count is changed from 0x1 to 0x2. When 0x002 is decoded from a reception packet at a timing $t_6$, the transmission count is changed from 0x2 to 0x3. Furthermore, when 0x101 is decoded from a reception packet at a timing $t_7$, the reception count is changed from 0x1 to 0x2.

When the internal status value is changed from 0x742 to 0x345 at a timing $t_8$, the changed internal status value 0x345 is written in the memory 8 in association with the time stamp, the one (1) bit information "1" indicative of an internal status. Here, the internal status value 0x345 coincides with the trigger data, and a stop pulse that provides an instruction to perform stop processing is output to the stop processing unit 9b. Furthermore, the transmission count and the reception count are written in the memory 8 in association with a time stamp and one (1) bit information "0" indicative of a counter value.

As mentioned above, in the third embodiment, the writing unit 72e writes the internal status value in the memory 8 at a timing at which the internal status value is changed until the internal status value coincides with the trigger data. On the other hand, when the internal status value coincides with the trigger data, the writing unit 72f writes the two counter values in the memory 8. Therefore, the data processing device 1b is capable of reducing the capacity of the memory 8 as compared with the case that histories are all recorded on the memory 8 as content recording information.

In the third embodiment, the explanation is made with respect to the case in which the history recording is stopped when the internal status value coincides with the trigger data. However, the history recording may be stopped when an instruction is received from a user, when an error detection circuit provided in a data processing device detects an error in the processing unit 23 or the like, when the memory 8 becomes full, or the like.

[d] Fourth Embodiment

Figure 8:
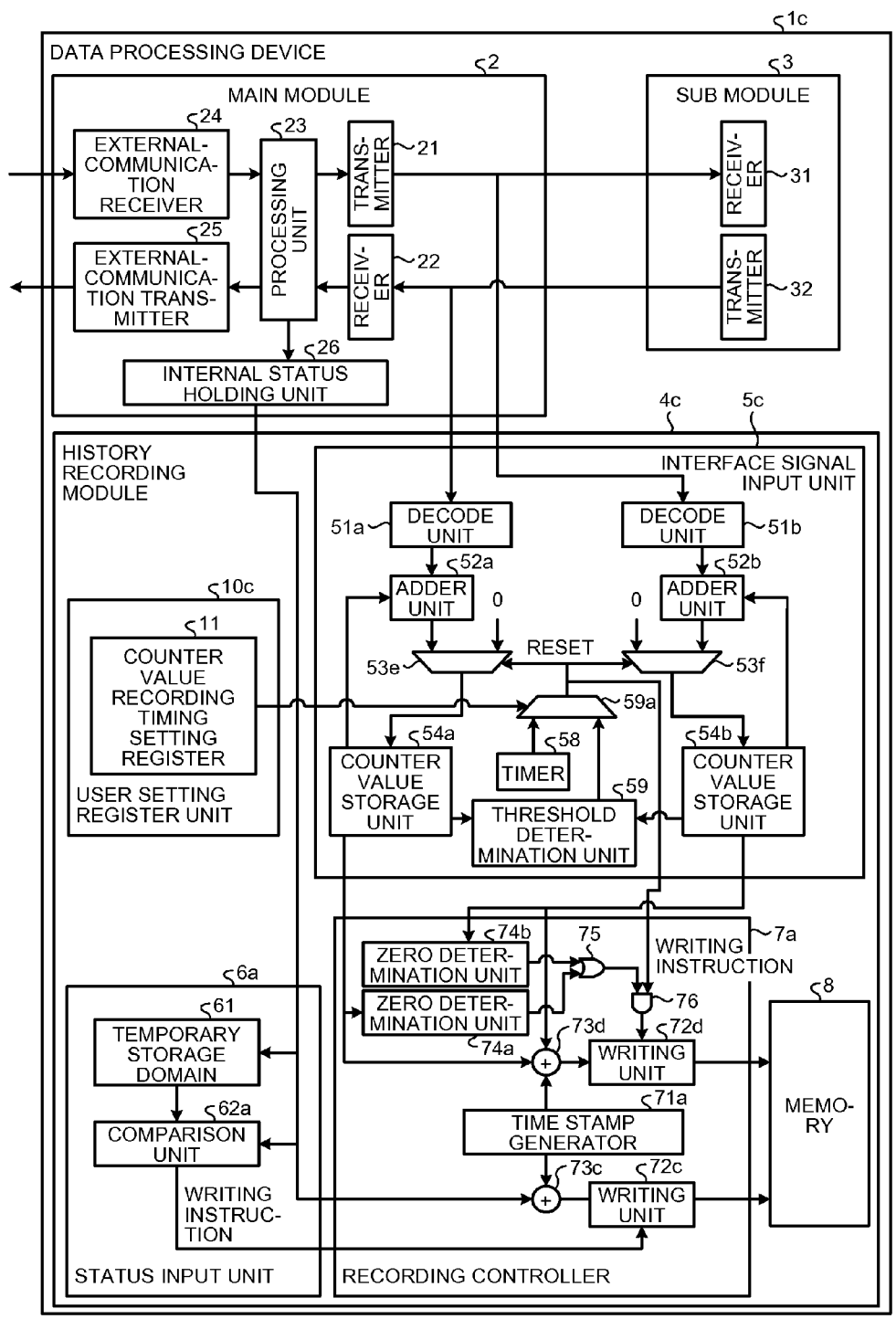
FIG. 8 is a view illustrating a configuration of a data processing device according to a fourth embodiment.

In a fourth embodiment, the explanation is made with respect to the case in which a transmission count and a reception count are written in the memory 8 at a timing set by a user. FIG. 8 is a view illustrating a configuration of a data processing device according to the fourth embodiment. Here, in the explanation made hereinafter, for the sake of convenience, function units having functions identical with those of the respective units illustrated in FIG. 4 are given same numerals, and their detailed explanations are omitted.

As illustrated in FIG. 8, a data processing device 1c has a history recording module 4c in place of the history recording module 4a illustrated in FIG. 4. The history recording module 4c has an interface signal input unit 5c in place of the interface signal input unit 5a illustrated in FIG. 4. The history recording module 4c has a user setting register unit 10c.

The interface signal input unit 5c has selection units 53e and 53f in place of the selection units 53c and 53d as compared with the interface signal input unit 5a illustrated in FIG. 4. The interface signal input unit 5c has a timer 58, a threshold determination unit 59, and a selection unit 59a in place of the timer 55.

Each of the selection units 53e and 53f receives a reset instruction from the selection unit 59a. The timer 58 instructs the selection unit 59a to write a counter value when a predetermined time elapses. The threshold determination unit 59 determines whether either one of counter values stored in the respective counter value storage units 54a and 54b reaches a predetermined threshold. When determining that either one of the counter values reaches the predetermined threshold, the threshold determination unit 59 instructs the selection unit 59a to write the counter values. The selection unit 59a selects the output of the timer 58 or the threshold determination unit 59 based on the setting of the user setting register unit 10c, outputs the writing instruction of the counter value to the recording controller 7 and, at the same time, outputs the reset instruction to the selection units 53e and 53f.

The user setting register unit 10c has a counter value recording timing setting register 11 as a register to be set by a user. The counter value recording timing setting register 11 stores therein whether the timing of recording a counter value is specified by the timer 58, or specified by the threshold determination unit 59.

In this manner, a user can record the counter value at a timing at which the user requires, by setting the timing of recording a counter value on the memory 8. In the fourth embodiment, although the selection unit 59a selects the timing of recording the counter value from the two timing specifications, the selection unit 59a may select the timing from three or more timing specifications. Furthermore, a user not only select the timing of recording a counter value on the memory 8 but also may select one of two provided circuits: a circuit that records history information as content recording information and a circuit that records the history information as count information.

[e] Fifth Embodiment

Figure 9:
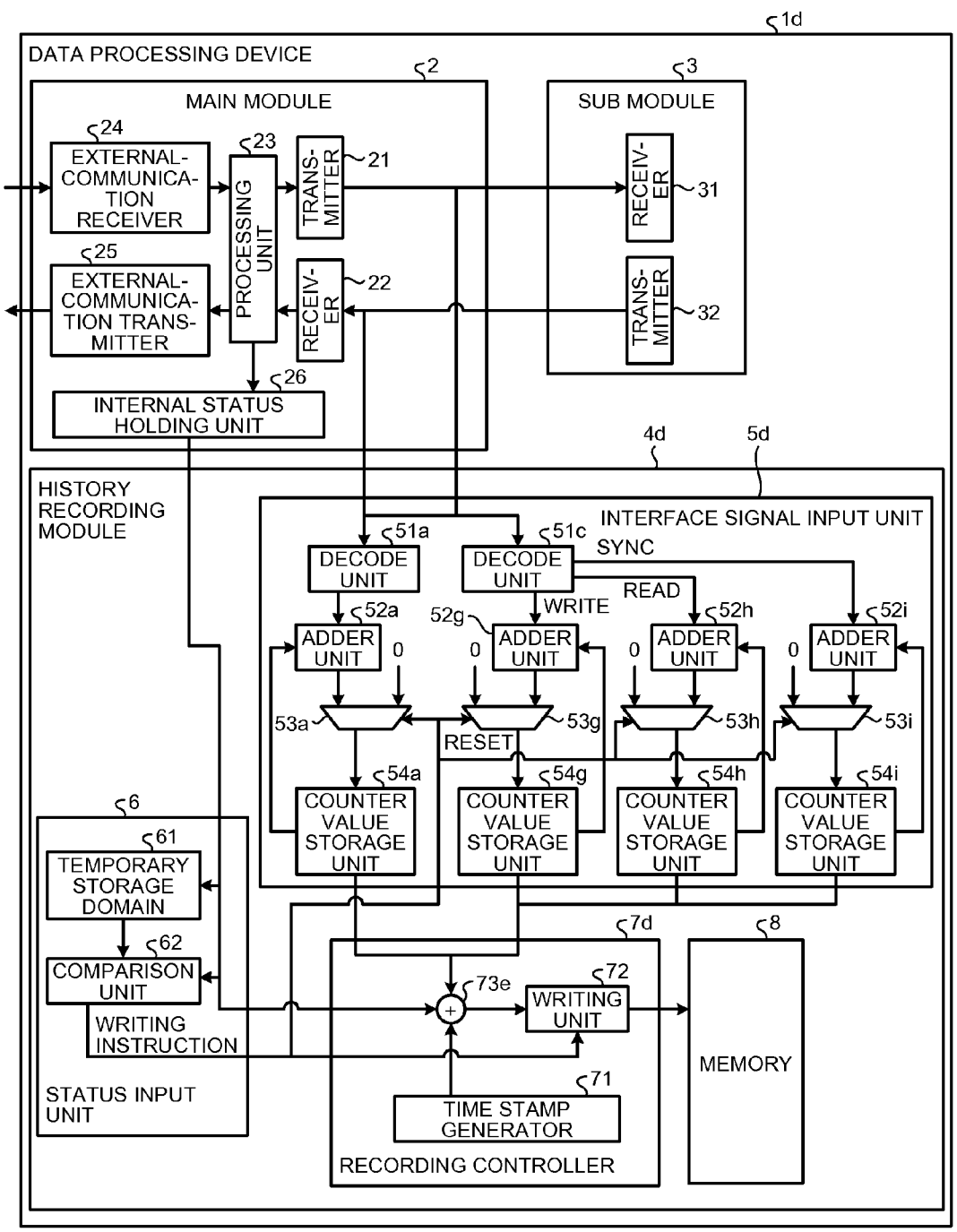
FIG. 9 is a view illustrating a configuration of a data processing device according to a fifth embodiment.

In a fifth embodiment, the explanation is made with respect to the case in which transmission packets are counted for each type of the transmission packet. FIG. 9 is a view illustrating a configuration of a data processing device according to the fifth embodiment. Here, in the explanation made hereinafter, for the sake of convenience, function units having functions identical with those of the respective units illustrated in FIG. 1 are given same numerals, and their detailed explanations are omitted.

As illustrated in FIG. 9, a data processing device 1d has a history recording module 4d in place of the history recording module 4 illustrated in FIG. 1. The history recording module 4d has an interface signal input unit 5d and a recording controller 7d in place of the interface signal input unit 5 and the recording controller 7 that are illustrated in FIG. 1, respectively.

The interface signal input unit 5d has a decode unit 51c in place of the decode unit 51b. The interface signal input unit 5d has adder units 52g, 52h, and 52i in place of the adder unit 52b, selection units 53g, 53h, and 53i in place of the selection unit 53b, and counter value storage units 54g, 54h, and 54i in place of the counter value storage unit 54b. The decode unit 51c outputs an addition instruction to each of the adder units 52g, 52h, and 52i based on whether the type of a packet decoded is "write", "read", or "sync".

The adder unit 52g, the selection unit 53g, and the counter value storage unit 54g count a transmission packet whose type is "write." The adder unit 52h, the selection unit 53h, and the counter value storage unit 54h count a transmission packet whose type is "read." The adder unit 52i, the selection unit 53i, and the counter value storage unit 54i count a transmission packet whose type is "sync."

Here, when the sub module 3 is a storage-device control module including a cache, "read" indicates that data of a corresponding address is read out from a storage device or the cache, and "write" also indicates that data of a corresponding address is written in the storage device or the cache. Furthermore, "sync" indicates that data temporarily recorded on the cache is written in the storage device, and synchronized.

The recording controller 7d writes a counter value in the memory 8 for each type with respect to a transmission packet. The recording controller 7d has a connection unit 73e in place of the connection unit 73. The connection unit 73e connects an internal status value, a time stamp, and counter values respectively stored in the counter value storage units 54a, 54g, 54h, and 54i.

In this manner, a user can analyze a history in more detail by counting a transmission packet for each type. The comparison unit 62 outputs a reset instruction to each of the selection units 53g, 53h, and 53i.

[f] Sixth Embodiment

Figure 10:
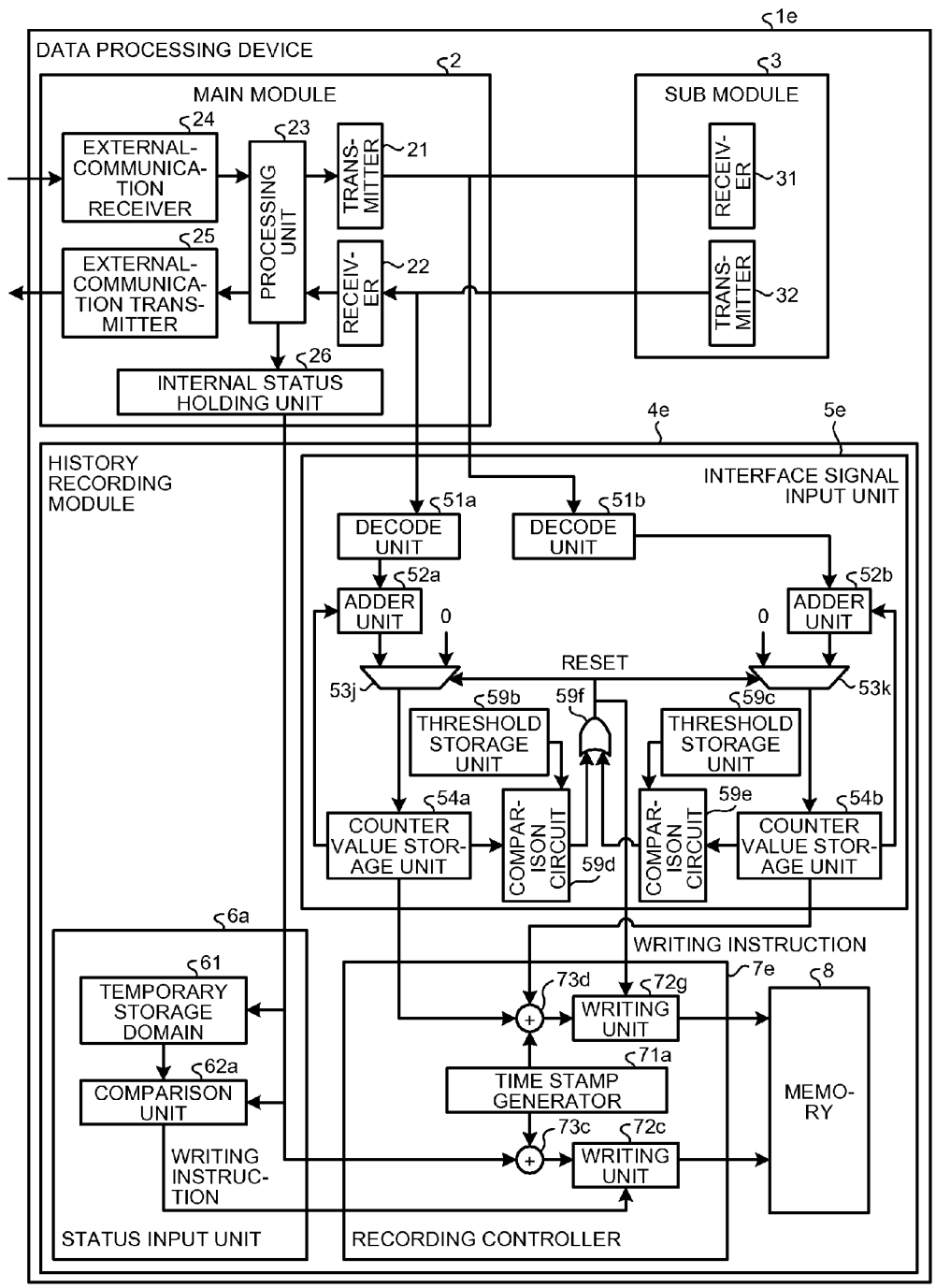
FIG. 10 is a view illustrating a configuration of a data processing device according to a sixth embodiment.

In a sixth embodiment, the explanation is made with respect to the case in which a counter value is written in the memory 8 when a transmission count or a reception count reaches a predetermined threshold. FIG. 10 is a view illustrating a configuration of a data processing device according to the sixth embodiment. Here, in the explanation made hereinafter, for the sake of convenience, function units having functions identical with those of the respective units illustrated in FIG. 4 are given same numerals, and their detailed explanations are omitted.

As illustrated in FIG. 10, a data processing device 1e has a history recording module 4e in place of the history recording module 4a illustrated in FIG. 4. The history recording module 4e has an interface signal input unit 5e and a recording controller 7e in place of the interface signal input unit 5a and the recording controller 7a that are illustrated in FIG. 4, respectively.

The interface signal input unit 5e has selection units 53j and 53k in place of the selection units 53c and 53d illustrated in FIG. 4. Furthermore, the interface signal input unit 5e has threshold storage units 59b and 59c, comparison circuits 59d and 59e, and an OR circuit 59f.

Each of the selection units 53j and 53k receives a reset signal from the OR circuits 59f. The threshold storage units 59b and 59c store therein respective thresholds that specify the respective timings of writing a transmission count and a reception count in the memory 8. The comparison circuits 59d and 59e compare respective counter values stored in the counter value storage units 54a and 54b with the respective thresholds stored in the threshold storage units 59b and 59c. When the respective counter values are greater than the respective thresholds, the comparison circuits 59d and 59e provide an instruction to write and reset the respective two counter values. The OR circuit 59f ORs outputs from the respective comparison circuits 59d and 59e, and provide an instruction to write and reset the counter values.

The recording controller 7e has a writing unit 72g in place of the writing unit 72d illustrated in FIG. 4. Furthermore, the recording controller 7e is constituted without having the zero determination units 74a and 74b, the OR circuit 75, and the AND circuit 76 that are included in the recording controller 7a illustrated in FIG. 4. The writing unit 72g receives a writing instruction from the OR circuit 59f, and writes the transmission count and the reception count in the memory 8 in association with a time stamp.

In this manner, the recording is made when a counter value exceeds a specific threshold and hence, a user can find out the timing at which a certain number of transmissions or receptions are performed. Here, the explanation is made with respect to the case in which both the transmission count and the reception count are recorded when either the transmission count or the reception count exceeds a threshold. However, when either the transmission count or the reception count exceeds the threshold, only the count that exceeds the threshold may be recorded. Furthermore, the threshold storage units 59b and 59c may store therein respective values identical with each other or respective values different from each other.

In the first to sixth embodiments, although the explanation is made with respect to the case in which the history of one internal status is recorded, the present invention is not limited to these examples, and also applicable to the case in which the histories of a plurality of internal statuses are recorded.

To consider, as an example, a case in which history information is classified as content recording information and count information, when the reception setting of an analog circuit in a communication unit is dynamically and automatically set depending on the quality of a reception signal, a reception setting value can be classified as content recording information, and the number of times of detecting errors in the received packets can also be classified as count information. It is unnecessary to record at any time when the error arises. There exists a case that it is sufficient to determine an error ratio, and it is useful that the present invention is applied to this case.

As another example, there exists a case that a transaction packet that transfers information to a main processing unit in a communications partner module and an acknowledgement packet (Ack) with respect to a packet received for confirming communication delivery are used for communication. Although the transaction packet requires the contents thereof, it is sufficient to determine that the number of the acknowledgement packet coincides with the number of the transaction packet. Therefore, it is unnecessary to determine detailed contents of the acknowledgement packet. In this case, the acknowledgement packet is classified as count information thus saving a memory for storing therein the histories.

As a different example, there exists a case that communication training (handshake) is performed for establishing a communication channel with a communication partner in a communication unit. There also exists a case that the state of the communication training (LTSSM State specified in the PCI Express standard, for example) is classified as the content recording information, and a packet for training (training sequence order set specified in the PCI Express standard, for example) that is transmitted to/from each state is classified as the count information. Here, the LTSSM State is the state of the Link Training and Status State Machine.

According to the embodiments, the amount of historical data may be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data processing device comprising:
a processing unit that performs data processing; and
a history recording module that records recording information of the processing unit, the history recording module comprising:
   a storage unit that stores therein the recording information, and
   a recording control unit that writes content recording information recording contents of the recording information, a time stamp and count information recording a value counted by the processing unit in the storage unit as the recording information, the recording information being classified into the content recording information and the count information and the recording control unit writing the count information in the storage unit, wherein the recording control unit comprises:
      a first writing unit that writes the content recording information; and
      a second writing unit that writes the count information when the counted value reaches a predetermined threshold.

2. The data processing device according to claim 1, wherein the second writing unit further writes the count information when the content recording information written by the first writing unit is information that provides an instruction to stop writing.

3. The data processing device according to claim 1, wherein the second writing unit writes the count information at a timing specified by a user.

4. The data processing device according to claim 3, wherein the timing specified by a user is a time when an error is detected by the data processing device.

5. The data processing device according to claim 1, wherein the recording control unit classifies the count information into a plurality of pieces of information and writes the pieces of information.

6. A method for controlling a data processing device that comprises a processing unit that performs data processing and a history recording module that records recording information of the processing unit in a storage unit, the method comprising, by the history recording module:
classifying recording information into content recording information and court information;
writing, with respect to the content recording information recording contents of the recording information out of recording information, a history of the contents in the storage unit; and
writing, with respect to the count information recording a value counted by the processing unit out of the recording information, the history of the counted value in the storage unit when the counted value reaches a predetermined threshold.

* * * * *